United States Patent
Lee et al.

(10) Patent No.: US 9,122,995 B2
(45) Date of Patent: Sep. 1, 2015

(54) CLASSIFICATION OF STREAM-BASED DATA USING MACHINE LEARNING

(75) Inventors: Bongshin Lee, Issaquah, WA (US);
Ashish Kapoor, Kirkland, WA (US);
Ratul Mahajan, Seattle, WA (US);
Blaine S. Christian, Cupertino, CA (US); Saleema Amershi, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 301 days.

(21) Appl. No.: 13/047,804

(22) Filed: Mar. 15, 2011

(65) Prior Publication Data

US 2012/0239596 A1    Sep. 20, 2012

(51) Int. Cl.
*G06N 99/00* (2010.01)

(52) U.S. Cl.
CPC .................................. *G06N 99/005* (2013.01)

(58) Field of Classification Search
CPC ....................................................... G06N 5/04
USPC ....................................... 706/11, 20; 702/58
See application file for complete search history.

(56) References Cited

U.S. PATENT DOCUMENTS

| | | | |
|---|---|---|---|
| 5,724,263 A | 3/1998 | Raguram et al. | |
| 7,084,752 B2 | 8/2006 | Parello et al. | |
| 7,388,482 B2 | 6/2008 | Dousson et al. | |
| 7,802,287 B2 | 9/2010 | Bialk et al. | |
| 2002/0111755 A1* | 8/2002 | Valadarsky et al. | 702/58 |
| 2008/0162390 A1* | 7/2008 | Kapoor et al. | 706/20 |
| 2008/0222059 A1* | 9/2008 | Baum-Waidner et al. | 706/12 |
| 2010/0153316 A1 | 6/2010 | Duffield et al. | |

OTHER PUBLICATIONS

Ahmed, et al., "Machine learning approaches to network anomaly detection", Retrieved at << http://www.usenix.org/event/sysml07/tech/full_papers/ahmed/ahmed.pdf >>, In Proceedings of the Second Workshop on Tackling Computer Systems Problems with Machine Learning, 2007, pp. 1-6.

"eG alarm manager", Retrieved at << http://www.eginnovations.com/web/egalarmmanager.htm >>, Retrieved Date: Oct. 29, 2010, pp. 2.

"Conductor VMS overview", Retrieved at << http://www05.abb.com/global/scot/scot296.nsf/veritydisplay/c3a5fa187e078285c1256bea005d211f/$file/wbpeeus220005c1_-_en_conductor_vms_product_overview.pdf >>, 2003, pp. 9.

Weiss, Gary M., "Predicting telecommunication equipment failures from sequences of network alarms", Retrieved at << http://citeseerx.ist.psu.edu/viewdoc/download?doi=10.1.1.34.1354&rep=rep1&type=pdf >>, Handbook of Data Mining and Knowledge Discovery, 2001, pp. 1-7.

(Continued)

*Primary Examiner* — Jeffrey A Gaffin
*Assistant Examiner* — Ola Olude Afolabi
(74) *Attorney, Agent, or Firm* — Dan Choi; Judy Yee; Micky Minhas

(57) ABSTRACT

The described implementations relate to data classification. One implementation includes identifying one or more likely classifications for an incoming data item using an algorithm. The implementation can also include providing the one or more identified classifications to a user. A selection of an individual identified classification for the incoming data item can be received from the user. The algorithm can be refined to reflect the selection by the user.

20 Claims, 6 Drawing Sheets

(56) References Cited

OTHER PUBLICATIONS

Appleby, et al., "Yemanja—A Layered event correlation engine for multi-domain server farms", Retrieved at << http://citeseerx.ist.psu.edu/viewdoc/download;jsessionid=1288D8FFC296C3E18E81E409EE22E462?doi=10.1.1.19.3793&rep=rep1&type=pdf , In Integrated Network Management VII, 2001, pp. 1-17.

Basu, et al., "Assisting users with clustering tasks by combining metric learning and classification", Retrieved at << http://research.microsoft.com/pubs/135531/iClustering-aaai-2010.pdf.pdf >>, Proceedings of the Twenty-Fourth AAAI Conference on Artificial Intelligence, AAAI, Jul. 11-15, 2010, pp. 7.

Desjardins, et al., "Interactive visual clustering", Retrieved at << http://citeseerx.ist.psu.edu/viewdoc/download?doi=10.1.1.94.699&rep=rep1&type=pdf>>, 11th International Conference on Intelligent User Interfaces, Jan. 28-31, 2007, pp. 1-10.

"EMC Ionix", Retrieved at << http://www.emc.com/products/family/ionix-family.htm >>, Retrieved Date: Oct. 28, 2010, pp. 2.

Fails, et al., "Interactive machine learning", Retrieved at << http://citeseerx.ist.psu.edu/viewdoc/download?doi=10.1.1.14.8362&rep=rep1&type=pdf >>, Seventh International Conference on Intelligent User Interfaces, Jan. 12-15, 2003, pp. 39-45.

Fisher, et al., "Using visualization to support network and application management in a data center", Retrieved at << http://citeseerx.ist.psu.edu/viewdoc/download?doi=10.1.1.145.7036&rep=rep1&type=pdf>>, Internet Network Management Workshop at ICNP, Oct. 2008, pp. 6.

Fogarty, et al., "CueFlik: interactive concept learning in image search", Retrieved at << http://www.cs.washington.edu/homes/jfogarty/publications/chi2008-cueflik.pdf , Conference on Human Factors in Computing Systems, Apr. 5-10, 2008, pp. 10.

Gardner, et al., "Methods and systems for alarm correlation", Retrieved at << http://ieeexplore.ieee.org/stamp/stamp.jsp?tp=&arnumber=594348 >>, Communications: The Key to Global Prosperity Global Telecommunications Conference, GLOBECOM, Nov. 18-22, 1996, pp. 136-140.

"HP OpenView", Retrieved at << http://managementsoftware.hp.com/services/hpss_tcs_ds_aug.pdf >>, Retrieved Date: Oct. 28, 2010, pp. 2.

Jain, et al., "Online metric learning and fast similarity search", Retrieved at << http://www.cs.utexas.edu/~pjain/pubs/online_nips.pdf >>, Proceedings of the Neural Information Processing Systems Conference (NIPS), Dec. 2008, pp. 1-8.

Jakobson, et al., "Alarm correlation: correlating multiple network alarms improves telecommunications network surveillance and fault management", Retrieved at << http://www.macs.hw.ac.uk/~dwcorne/RSR/eventcorr.pdf >>, Nov. 1993, pp. 52-59.

Klemettinen, et al., "Rule discovery in telecommunication alarm data", Retrieved at << http://www.cs.helsinki.fi/u/htoivone/pubs/jnsm99.pdf >>, Journal of Network and Systems Management, vol. 07, No. 4, 1999, pp. 395-423.

Lakkaraju, et al., "NVisionIP: netflow visualizations of system state for security situational awareness", Retrieved at << http://www.cs.pitt.edu/~adamlee/pubs/2004/vizsec04.pdf >>, Proceedings of the 2004 ACM workshop on Visualization and data mining for computer security, 2004, pp. 8.

Liu, et al., "Composite events for network event correlation", Retrieved at << http://citeseerx.ist.psu.edu/viewdoc/download;jsessionid=21B68D696DBC3064559B66E131C17EA8?doi=10.1.1.56.9237&rep=rep1&type=pdf >>, Proceedings of the Sixth IFIP/IEEE International Symposium on Integrated Network Management, 1999. Distributed Management for the Networked Millennium, 1999, pp. 14.

Spring, et al., "Measuring ISP topologies with rocketfuel", Retrieved at << http://conferences.sigcomm.org/sigcomm/2002/papers/rocketfuel.pdf >>, IEEE/ACM Transactions on Networking, Feb. 2004, pp. 13.

Steinder, et al., "A Survey of fault localization techniques in computer networks", Retrieved at << http://www.cis.udel.edu/~sethi/papers/04/socp04.pdf >>, Science of Computer Programming, Special Edition on Topics in System Administration, vol. 53, No. 2, Nov. 2004, pp. 165-194.

Yemini, et al., "High speed and robust event correlation", Retrieved at << http://research.microsoft.com/en-us/um/people/alicez/papers/ieeecomm96.pdf , May 1996, pp. 82-90.

Amershi, Saleema et al.; "CueT: Human-Guided Fast and Accurate Network Alarm Triage"; to be published CHI 2011; May 7-12, 2011; Vancouver, BC, Canada; pp. 1-10.

Brugnoni, S. et al.; "An Expert System for Real Time Fault Diagnosis of the Italian Telecommunications Network"; Proceedings of the Third International Symposium on Integrated Network Management; Apr. 18-23, 1993; San Francisco, CA; pp. 617-628.

* cited by examiner

CLASSIFICATION OF STREAM-BASED DATA USING MACHINE LEARNING

BACKGROUND

Existing tools for classifying data streams can help reduce the complexity of certain tasks. As a particular example, tools exist for classifying a stream of network alarms based on the relative severity of the alarms, the cause of the alarms, or other alarm attributes. Such tools typically use expert-defined rules to automate classification of the individual alarms. However, such rule-based systems are relatively inflexible and generally do not adapt well to changing network conditions or other contingencies. Furthermore, improvements to existing rule-based systems typically require continuous expert involvement to refine the system rules offline.

Techniques also exist for visualizing streaming data and various classifications of the streaming data. For example, network alarms can be displayed in a tabular format including various alarm attributes on a graphical user interface. However, existing visualization techniques are frequently decoupled from the underlying classification systems. As one example, users may make real-time decisions to reclassify streaming data items using graphical user interfaces such as the aforementioned tabular formats. However, these real-time decisions typically are not incorporated into the underlying classification systems.

SUMMARY

This document relates to data classification. One implementation includes identifying one or more likely classifications for an incoming data item using an algorithm. The implementation can also include providing the one or more identified classifications to a user via an interface, and receiving a selection, from the user, of an individual identified classification for the incoming data item. The implementation can also include refining the algorithm to reflect the selection by the user of the selected classification.

Another implementation includes identifying one or more likely classifications for a data item from a working set of classifications. The likely classifications can be identified using an algorithm. The implementation can also include providing the one or more likely classifications to an entity via an interface and receiving, from the entity, a selection of an individual likely classification for the data item. The implementation can also include refining the algorithm to reflect the selection by the entity of the selected classification.

Another implementation can include an algorithm engine that is configured to recommend tickets to which an incoming alarm can be assigned. The implementation can also include an interface module configured to provide the recommended tickets to a user via a graphical user interface, and receive a selection, from the user, of an individual ticket to which the incoming alarm is assigned. The selection can be received via the graphical user interface. The implementation can also include an algorithm update module configured to refine the algorithm to reflect the selection.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This document relates to data classification, and more specifically to using at least partially automated techniques to suggest classifications for incoming data items and to refine the techniques based on user selections from the suggested classifications.

Generally speaking, a data stream can include a number of discrete, individual data items. For example, video and audio data are often downloaded as a "stream" of individual data packets. As used herein, the term "data stream" or "stream" more generally refers to any data items that are received over a period of time, such as the network alarms mentioned above. A data stream can be contrasted to a static data pool because, in the case of data stream, incoming data items are often constantly changing. Thus, in implementations where data streams are processed, the techniques disclosed herein can be performed "online" or "real-time" as an incoming data stream changes over time. However, note that the disclosed techniques can also be used with incoming data from a static data pool, e.g., a database, data table, or other form of data. Using the techniques disclosed herein, individual incoming data items from a data stream or a static data pool can be classified into one or more groups based on various attributes of the data items.

As discussed in more detail below, the disclosed implementations can identify potential or likely classifications for individual data items from a data stream and then provide the identified classifications as a ranked list to a user. For example, one or more likely classifications for a particular data item can be identified using a classification algorithm. The identified classifications can then be displayed to a user on a graphical user interface, and the user can select from the displayed classifications. The user's selected classification can be used to refine the classification algorithm. Furthermore, the disclosed implementations can be performed iteratively to continually refine the classification algorithm based on the classifications that are selected by the user as more data items are received.

Example System

Figure 1:
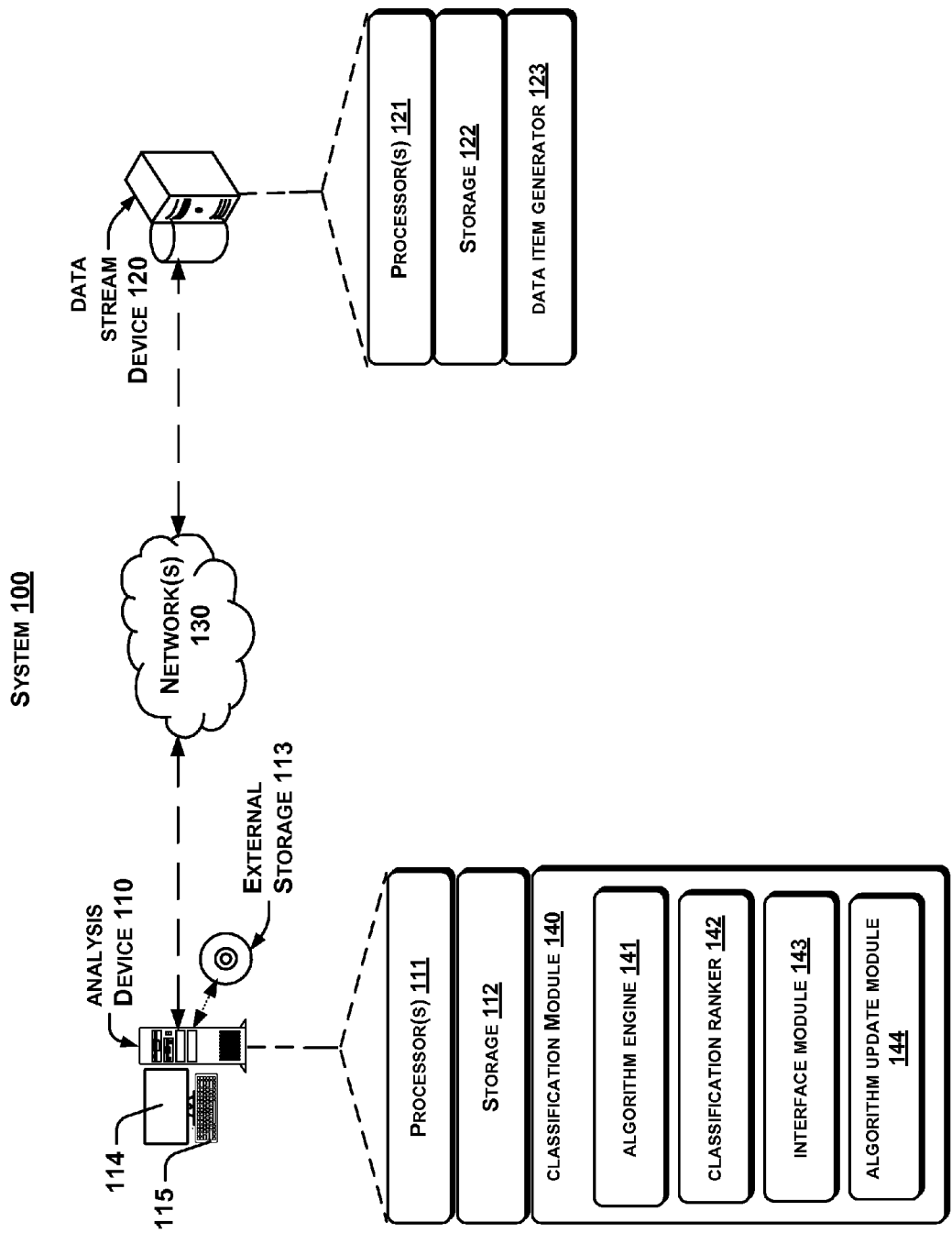
FIG. 1 shows an example of an operating environment and components of several devices in accordance with some implementations of the present concepts.

FIG. 1 illustrates an example system in which the described classification techniques may be implemented in accordance with some embodiments. In this example, a system 100 includes multiple computing devices, represented here as analysis device 110 and data stream device 120. These computing devices can function in a stand-alone or cooperative manner to implement the described techniques. Furthermore, in this example, analysis device 110 and data stream device 120 can exchange data over one or more network(s) 130. Additionally, analysis device 110 and/or data stream device 120 can exchange data with one or more other types of devices via network(s) 130 (e.g., additional data stream devices via a cloud). Without limitation, network(s) 130 can include one or more local area networks (LANs), wide area networks (WANs), the Internet, and the like.

Here, each of analysis device 110 and/or data stream device 120 can include a processor(s) and storage. More particularly, here analysis device 110 includes processor(s) 111 and storage 112. Similarly, data stream device 120 includes processor(s) 121 and storage 122. The processor(s) 111 and 121 can execute data in the form of computer-readable instructions to provide the functionality described herein. Data, such as computer-readable instructions, can be stored on storage 112 and/or 122. Storage 112 and/or 122 can include one or more of volatile or non-volatile memory, hard drives, optical storage devices (e.g., CDs, DVDs etc.), among others.

Analysis device 110 and/or data stream device 120 can also be configured to receive and/or generate data in the form of computer-readable instructions from one or more other storages, such as external storage 113 shown here. Examples of external storage can include optical storage devices (e.g., CDs, DVDs etc.) and flash storage devices (e.g., memory sticks or memory cards), among others. Analysis device 110 and/or data stream device 120 may also receive data in the form of computer-readable instructions over the network(s) 130 that is then stored thereon for execution by corresponding processor(s) 111 and/or 121. As used herein, the term "computer-readable media" can include transitory and non-transitory instructions. In contrast, the term "computer-readable storage media" excludes transitory instances, and includes volatile or non-volatile storage devices such as those discussed above with respect to storage 112, 122, and external storage 113.

In some implementations, analysis device 110 can be configured to display one or more graphical user interfaces. Accordingly, here analysis device 110 is shown as including and/or being associated with a display device 114. Analysis device 110 is also shown as interfacing with (and thus being associated with) input/output devices, for example a keyboard device 115.

Analysis device 110 is also shown as implementing at least part of a classification module 140. As will be described in further detail below, classification module 140 can, in turn, include an algorithm engine 141, a classification ranker 142, an interface module 143, and/or an algorithm update module 144.

In some embodiments, analysis device 110 may function in a stand-alone configuration such that all of classification module 140 is implemented by analysis device 110. In other words, in such embodiments, algorithm engine 141, classification ranker 142, interface module 143, and algorithm update module 144 may all be implemented by resources provided by analysis device 110.

In other embodiments, some of classification module 140 may be implemented using other resources provided by data stream device 120 and/or one or more other computing devices. For example, all or part of classification module 140, including algorithm engine 141, classification ranker 142, interface module 143, and algorithm update module 144 may be implemented by cloud-based resources. The cloud-based resources may be provided by any number of known and/or unknown distributed computing devices connected to analysis device 110 via network(s) 130 (e.g., via the cloud). Results of the processing may then be displayed on display device 114 and/or sent to data stream device 120 or another device.

Generally speaking, analysis device 110 and/or data stream device 120 can be implemented as "computing devices." The term "computing device" as used herein can mean any type of device or devices having some amount of processing capability. Examples of computing devices can include traditional computing devices, such as personal computers (desktop, portable laptop, etc.), cell phones, smart phones, personal digital assistants, or any of a myriad of ever-evolving or yet to be developed types of computing devices.

Classification Module

As mentioned above, analysis device 110 can host a classification module 140, which can generally be configured to classify one or more data items received from data stream device 120. Classification module 140 can include an algorithm engine 141, which can be configured to implement various algorithms for classifying the individual data items. For example, algorithm engine 141 can implement machine learning techniques such as nearest-neighbor interpolation, clustering, neural networks, statistical modeling, or other techniques. Classification ranker 142 can be configured to rank one or more existing or new classifications provided by algorithm engine 141, e.g., from a most-likely classification for an individual data item to the least-likely classification for the individual data item. Interface module 143 can be configured to generate a graphical user interface that displays the ranked classifications to a user, and to receive user input to select one of the displayed classifications. Algorithm update module 144 can be configured to refine algorithm engine 141 to reflect the selected classification.

Example Method

Figure 2:
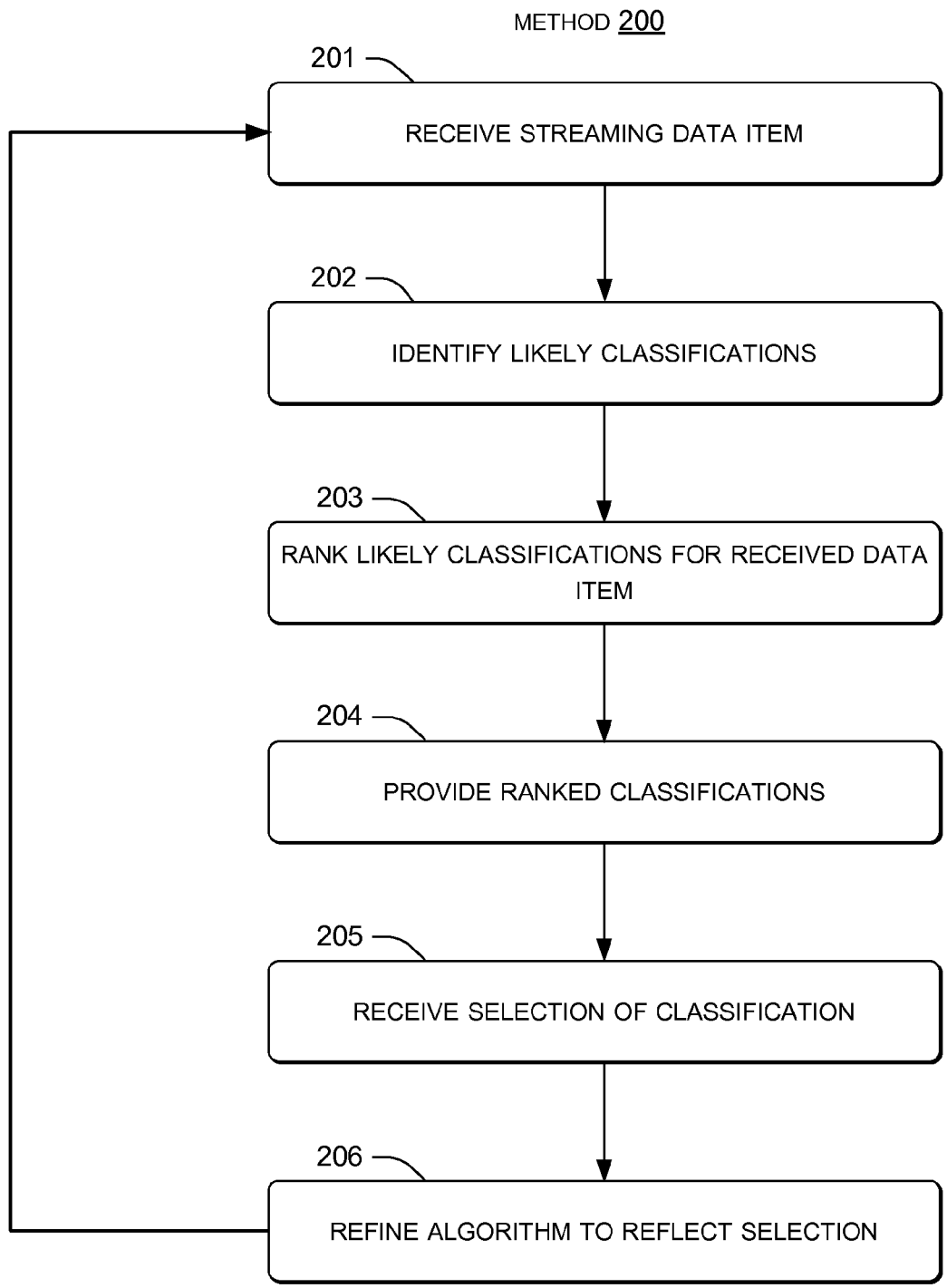
FIG. 2 shows a flowchart of an exemplary method that can be accomplished in accordance with some implementations of the present concepts.

FIG. 2 illustrates a method 200 that is suitable for implementation in system 100 or other systems. Analysis device 110 can implement method 200, as discussed below. Note that method 200 is discussed herein as being implemented on analysis device 110 for exemplary purposes, but is suitable for implementation on many different types of devices.

Streaming data items can be received at block 201. For example, analysis device 110 can receive streaming data items from other devices, such as data stream device 120. In some implementations, data item generator 123 on data stream device 120 generates data items and transmits the data items over network(s) 130 to analysis device 110. The streaming data items can be any data items suitable for classification by classification module 140. For example, the streaming data items can be alarms, events, images, sounds, word processing files, database records, text files, etc.

Likely or potential classifications can be identified at block 202. For example, algorithm engine 141 can compare the received data item to one or more other data items that have already been classified into a set of classifications. Relationships between the received data item and the classifications can be determined based on the comparing, and the relationships can be represented in various ways. For example, a numerical representation of distance between any two data items can be calculated by algorithm engine 141.

In some implementations, algorithm engine 141 calculates distances between the received data item and one or more representative data items from each classification. In such implementations, the received data item can be compared to representative data items for multiple classifications to identify which, if any, of the multiple classifications are likely to be selected by a user as the correct classification for the received data item. Thus, considering a received data item D, the received data item can be closest to three already-classified data items and corresponding classifications, e.g., a data item A from a first classification, a data item B from a second classification, a data item C from a third classification. Distance measures or other metrics can be determined at block 202 to represent the relationships between the received data item D and the already-classified data items. Note that, in further implementations, the received data item can be compared to some or all already-classified data items from the set of classifications.

The likely classifications for the received data item can be ranked at block 203. For example, based on the relationships (e.g., distances) discussed above, received data item D may be closest to item C, next-closest to item B, and furthest from item A. In turn, the classifications for data item D can be ranked by classification ranker 142 in the order 3, 2, 1, i.e., the classifications for items C, B, and A, respectively. In implementations where the relationships are represented by a distance metric, the rankings may be in increasing order of distance, with higher-ranked classifications corresponding to shorter distances between data items. In some implementations, the classifications can include a recommendation for a new classification, e.g., a classification 4. Exemplary new classification recommendations are discussed in more detail below.

One or more of the ranked classifications can be provided for selection at block 204. For example, algorithm engine 141 can be configured to select a predetermined number of the top-ranked classifications, e.g., the top 2 classifications, and suggest them as correct classifications for data item D. Interface module 143 can be configured to display the top-ranked classifications on display device 114 using a graphical user interface. Alternatively, interface module 143 can be configured to transmit the graphical user interface to another device for display thereon, such as data stream device 120 or another device.

A selection of a ranked classification can be received at block 205. For example, classification module 140 can receive a selection of one of the displayed classifications from a user at analysis device 110, data stream device 120, and/or another device. In other implementations, the selection can be performed in an automated fashion, e.g., using an entity such as an automated verification technique to select a classification for the received data item D. For the purposes of this example, the selected classification for data item D is classification 2.

The classification algorithm can be refined to reflect the selected classification at block 206. For example, algorithm update module 144 can refine algorithm engine 141 to reflect the selection of classification 2 for data item D. In some implementations, this can be performed by storing data reflecting the selection of classification 2 for data item D. This, in turn, can cause subsequent iterations of method 200 to rank classification 2 more highly than classifications 1 and 3 for other received data items that are identical to or similar to data item D.

For example, consider performing method 200 again, and a new data item E, similar to item D, is received at block 201. In the discussion above, the classifications were ranked 3, 2, 1 at block 203 for data item D. However, note that algorithm engine 141 has now been updated to reflect the classification of item D to classification 2. Thus, this subsequent iteration of method 200 can rank the classifications for data item E as 2, 3, 1. In other words, because data item E is similar to data item D, and data item D was classified in classification 2 in the previous iteration of method 200, classification 2 is now the highest-ranked classification for data item E. This, in turn, is a consequence of the refinement of the algorithm at block 206 in the previous iteration.

Note that method 200 can be performed iteratively over time to refine and update algorithm engine 141. This, in turn, can continually refine the ranking scheme so that the rankings provided at block 204 are more likely to reflect the appropriate classifications for incoming data items. From the perspective of the user or automated verification technique that selects the classifications at block 205, this can aid in choosing the appropriate classification.

Example Graphical User Interface

Figure 3:
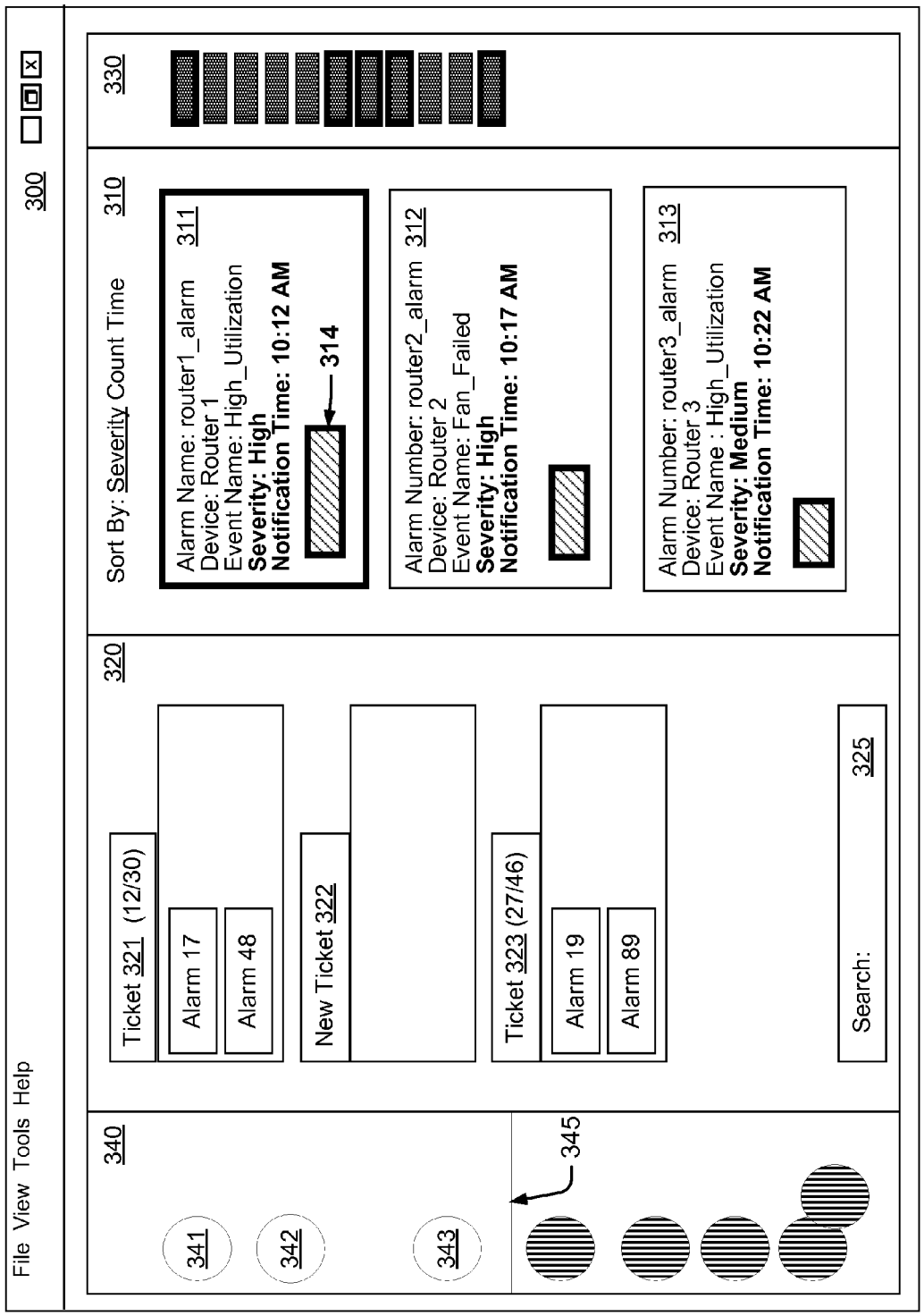
FIGS. 3 and 4 show exemplary graphical user interfaces that can be presented in accordance with some implementations of the present concepts.

As discussed above, interface module 143 can generate a graphical user interface that is used to provide suggested classifications to a user and to receive a user selection of a suggested classification. FIG. 3 illustrates an exemplary graphical user interface 300 that can be generated by interface module 143. For this particular example, the streaming data items are network alarms that can be categorized by the user into various tickets. The tickets represent groups of related alarms that can, for example, be assigned to a technician for resolution of network issues.

Graphical user interface 300 can include an alarm view 310 on the right side, which displays alarms that stream in from network(s) 130. Graphical user interface 300 can also include a ticket view 320 that displays recommended classifications for the incoming alarms. In this example, the recommended classifications for each incoming alarm include tickets to which the alarms can or should be assigned for resolution by a network technician. Generally speaking, a user of graphical user interface 300 can "triage" individual incoming alarms by assigning them to a particular ticket for resolution by the network technician.

To triage an incoming alarm, the user clicks on an alarm in alarm view 310. Algorithm engine 141 can perform processing such as that discussed above with respect to method 200, and rank one or more tickets as likely classifications for the selected alarm. For example, the user can use a mouse or other input device to select alarm 311. Responsive to the user selection, interface module 143 displays one or more of the ranked tickets for alarm 311 in ticket view 320. In the example shown in FIG. 3, the three recommended classifications for alarm 311 are ticket 321, start new ticket 322, and ticket 323, arranged from top to bottom in ranked order. In other words, algorithm engine 141 recommends ticket 321 as the top-ranked ticket for alarm 311, then new ticket 322 as the second highest-ranked ticket, then ticket 323 as the third highest-ranked ticket.

Once the user views the recommended tickets on graphical user interface 300, the user can then inspect the recommendations to determine how to triage the alarm (that is, either add it to an existing ticket or start a new one). The user can classify the alarm by dragging and dropping it onto the appropriate ticket in ticket view 320. In some implementations, the user can instead classify the alarm by right-clicking the alarm to open a pop-up menu, or simply double-click the alarm to choose the top-ranked recommended ticket. In some implementations, graphical user interface 300 also contains a search interface 325 through which a user can search for existing tickets by entering a search string. Thus, if the user does not wish to assign alarm 311 to one of the recommended tickets, the user has the option to manually assign alarm 311 to an existing ticket that is not recommended by algorithm engine 141 by performing a manual search, e.g., using text matching or other techniques. The search results can be displayed in graphical user interface 300 or another interface (not shown), and users can add alarms to the tickets appearing in the search results, e.g., using drag-and-drop as discussed above.

Alarm View

Network alarms can have various different associated attributes, e.g., the name of the device that generated the alarm, the type of device (e.g., router, switch, server), the part of the device that generated the alarm (e.g., port number, fan, software module), alarm name (can be a string including the name of the device that generated the alarm, e.g., router1_alarm), severity of the alarm (e.g., integer ranging from 1 to 5, low, medium, and high, etc.), and/or an event name (fan_failed, high_utilization, etc.). Some or all of these attributes can be displayed with individual alarms 311, 312, and 313 in alarm view 310. Under some circumstances, severity and notification time can be particularly useful for determining which alarm the user should triage next. Thus, these particular attributes can be displayed prominently with each alarm, e.g., shown in FIG. 3 as bolded attributes of alarms 311, 312, and 313. In other implementations, other techniques can be used to visually distinguish between the severity of the alarms, e.g., by color: red (most severe), orange-red, orange, yellow, and white (least severe).

In some circumstances, users are working under a service level agreement (SLA) which formally defines the time limit in which an alarm should be triaged. Classification module 140 can compute if an alarm is approaching or has passed this limit using the alarm's notification time. Interface module 143 can highlight when an alarm has passed this limit by visually distinguishing the alarms that have exceeded the SLA time limit. For example, alarm 311 can be shown with a hashed line or other texture to indicate the SLA time limit for triaging this alarm has been exceeded. Other techniques, e.g., coloring, flashing, etc. can be used to visually distinguish alarms that have exceeded predetermined time thresholds such as the SLA time thresholds.

In some implementations, a graphical representation of duplicate alarms can be provided on graphical user interface 300. For example, sometimes multiple identical alarms are generated, e.g., the attributes other than the notification time and/or alarm number are identical. Each alarm can have a corresponding count attribute indicating the number of identical alarms. Users may sometimes want to use the count attribute of an alarm to determine what alarm to triage next, because many duplicate alarms sometimes signal a severe problem. Graphical user interface 300 can include a count bar 314, the length of which can be proportional to the number of duplicate alarms. Thus, the longer count bar 314, the more duplicates for that alarm have been observed. Considering FIG. 3, more duplicate alarms have been received for alarm 311 than for alarm 312, and in turn more duplicate alarms have been received for alarm 312 than for alarm 313. In some implementations, when duplicates are observed, the time in which the last duplicate was observed is also displayed in alarm view next to the alarm (not shown in FIG. 3).

In some implementations, alarm names, numbers, and other attributes can also be graphically displayed and/or emphasized, e.g., bold, italics, different colors, etc. This can depend, for example, on the way alarm names are constructed and the type of information that they convey. Alarm names that convey certain information may be useful for comparing alarms to existing tickets and deciding how to triage the alarm. Thus, given an alarm name such as router1_alarm, the alarm name tells the user the name of the device ("router1"). However, alarm names generally can include any alarm attribute.

The rest of the alarm information displayed with alarms 311, 312, and 313 can include other alarm attributes. For example, device types, event names, and/or other textual descriptions of the alarm can be displayed with the individual alarms. In some implementations, less-important attributes can be displayed less saliently with the corresponding alarm, e.g., no italics and/or bold, deemphasized by color (e.g., gray), smaller font, etc. Such a layout can allow users to visually scan and compare alarms by severity, time (including whether an alarm is past its SLA time) and count while still being able to digest the rest of the alarm information in a compact representation.

Note that alarm view 310 does not necessarily reflect alarm attributes for all incoming alarms, e.g., there may be so many incoming alarms that there is insufficient room to display attributes of each incoming alarm. Graphical user interface 300 includes a streaming alarm view 330 that includes a graphical representation of each incoming alarm that has yet to be triaged, e.g., each box represents one incoming alarm. In some implementations, each box representing a high-severity alarm is bolded or otherwise visually distinguished (e.g., color coded) by that alarm's severity.

The incoming alarms shown in streaming alarm view 330 can also be visually distinguished if that particular alarm is past its SLA threshold, e.g., by flashing the alarm, displaying a particular pattern, color-coding, etc. In further implementations, the heights of the boxes automatically adjust so as to allow each of the alarms currently available for triage to be shown within graphical user interface 300. The boxes can also be sorted in the order that alarms are displayed in alarm view 310. Note that the alarms displayed in alarm view 310 and/or streaming alarm view 330 can be sorted by any attribute of the alarm and displayed in order based on the sorting. For example, as shown in FIG. 3, the alarms are currently sorted by severity as indicated by the underlined "severity" in alarm view 310. Thus, for example, user may have chosen to have the alarms sorted by severity by clicking "severity" in alarm view 310. This, in turn, allows the user to see the most severe alarms at the top of streaming alarm view 330 and/or alarm view 310. If, instead, the user prefers to see the most recent (or oldest) alarms at the top of streaming alarm view 330 and/or alarm view 310, the user can choose to have the alarms sorted by clicking "time." The alarms can also be sorted by other attributes that are not shown in FIG. 3. In some implementations, this allows streaming alarm view 330 to act as a scroll bar for easy alarm navigation by the user. In further implementations, the alarm being triaged (e.g., alarm 311) can be shown with a bolded outline to distinguish the alarm from other alarms that are not currently being triaged (e.g., alarms 312 and 313).

Ticket View

As introduced above, tickets are a collection of related alarms, e.g., alarms that are suitable for resolution together. For example, a ticket can represent alarms that are related because they all stem from a common device failure, software glitch, virus, etc. In some implementations, however, the underlying fault is not known beforehand, and algorithm engine 141 makes recommendations for grouping alarms into tickets based on the distance metric introduced above with respect to method 200. Furthermore, as introduced above, users can make the final determination as to which ticket each incoming alarm is assigned using graphical user interface 300.

In some implementations, each ticket has a parent alarm, which can be manually determined by a human operator and/or selected by algorithm engine 141. The parent alarm can represent the most severe alarm on the ticket and/or the earliest alarm that was received and assigned to the ticket. As shown in FIG. 3, interface module 143 can display the parent alarm at the top of each ticket, e.g., the parent alarm for ticket 321 is alarm 17 and the parent alarm for ticket 323 is alarm 19.

Note, however, that FIG. 3 also includes an option to start new ticket 322 which does not include a parent alarm. Thus, in implementations where the parent alarm is the earliest alarm on the ticket, the parent alarm can be set with alarm 311 for a new ticket when the user drags alarm 311 and drops alarm 311 in start new ticket 322.

In some implementations, a label at the top of the ticket is color coded or otherwise visually distinguished by severity of the ticket's parent alarm. The ticket label can also include the ticket's unique ID (e.g., ticket 321, ticket 323, etc.), which can automatically be generated by classification module 140 at the time the ticket is created. In some implementations, ticket view 320 can also reflect the number of unique alarms within that ticket followed by the total number of duplicate alarms, e.g., 12 total alarms with 30 duplicates for ticket 321 and 27 total alarms with 46 duplicates for ticket 323. Unique alarms and duplicates can also be represented in the ticket graphically as well as numerically, e.g., as a series of horizontal bars for each unique alarm with the length of the horizontal bar representing the corresponding number of alarms for and/or duplicates for each ticket (not shown, similar to the count 314 in alarm view 310). The visual representation of each ticket can be distinguished in a similar manner as discussed above with respect to the tickets, e.g., using bolding, color coding, flashing, etc. to indicate the severity of the parent alarm.

In some implementations, information about the ticket's parent alarm can be displayed along with the ticket description, e.g., entered by the user that originally created the ticket. A best-matching alarm can also be determined by algorithm engine 141, and interface module 143 can display the best-matching alarm below the parent ticket. The best-matching alarm can be determined based on the closest alarm that has already been assigned to that ticket. Thus, considering FIG. 3, the parent alarm for ticket 321 is alarm 17, and of the other alarms on ticket 321, alarm 48 is the one that best matches the alarm currently selected for triage (alarm 311). Likewise, alarm 19 is the parent alarm for ticket 323, and, of the other alarms assigned to ticket 323, alarm 89 best matches alarm 311. Thus, the best matching alarm serves as an explanation for why algorithm engine 141 is recommending that an operator triage an alarm into a given ticket. Ticket representations displayed in ticket view 320 can be tailored for each alarm in the manner described above.

In some implementations, users can also click on an individual ticket to display all the alarms currently grouped within the ticket (not shown). Moreover, users can view recommended tickets for the other alarms in alarm view 310 simply by selecting the alarm. Thus, if the user selects alarm 312, graphical user interface 300 will update to reflect recommended tickets for alarm 312. Note that each time a user selects a ticket in ticket view 320, this can initiate a corresponding iteration of method 200 to suggest tickets for the following selected alarm.

Ticket Distance Overview 340

Graphical user interface 300 can also include a ticket distance overview 340 which generally illustrates the confidence of algorithm engine 141 in the recommended tickets. For example, when an operator clicks on an alarm to triage in alarm view 310, algorithm engine 141 can generate its ticket recommendations for the selected alarm and interface module 143 provides them for display in ticket view 320. Circular representations of each recommended ticket can be shown in ticket distance overview 340.

Considering FIG. 3, circle 341 corresponds to ticket 321, circle 342 corresponds to new ticket 322, and circle 343 corresponds to ticket 323. Generally speaking, the representations can be shown in order of increasing distance from the alarm according to the distance function described above with respect to method 200. Thus, the closer the corresponding circle is to the top of ticket distance overview 340, the smaller the distance between the ticket and the alarm. Thus, noting that circle 341 is relatively close to the top of ticket distance overview 340, this indicates that ticket 321 has a relatively small distance from alarm 311. Likewise, because circle 342 is somewhat further from the top of ticket distance overview 340, new ticket 322 has a somewhat greater distance from alarm 311, and so on. In this manner, ticket distance overview 340 provides the user with a quick reference that indicates the distance of each recommended ticket from the alarm.

By viewing ticket distance overview 340, the user can gauge the relative likelihood that individual tickets are the correct recommendation for the incoming alarm. For example, if the top two tickets for alarm 311 are very close together, this suggests that the user should investigate the alarm and recommended tickets more closely before assigning the alarm to the highest-ranked ticket. Conversely, if the highest-ranked ticket is much closer to the top than the next highest-ranked ticket, this suggests that the user can be relatively confident in assigning the alarm to the highest-ranked ticket.

By default, classification module 140 can be configured to display only the top three tickets for the alarm being triaged. Generally speaking, three recommended tickets is a reasonable number that helps to balance the burden on the user triaging the incoming alarms and the probability of the displayed tickets containing the correct recommendation. However, if the user does not wish to assign a particular ticket to one of the top three recommendations, the user can reveal more tickets for inspection as follows.

Ticket distance overview 340 can include a moveable element such as a horizontal reveal bar 345, which allows the user to set the distance threshold for the tickets to be displayed in ticket view 320. In some implementations, reveal bar 345 divides the circles into a visible region and an invisible region. The visible region above reveal bar 345 can correspond to visible tickets in ticket view 320, e.g., ticket 321, new ticket 322, and ticket 323. The invisible region below reveal bar 345 is represented by patterned circles and can correspond to tickets not currently visible in ticket view 320.

Figure 4:
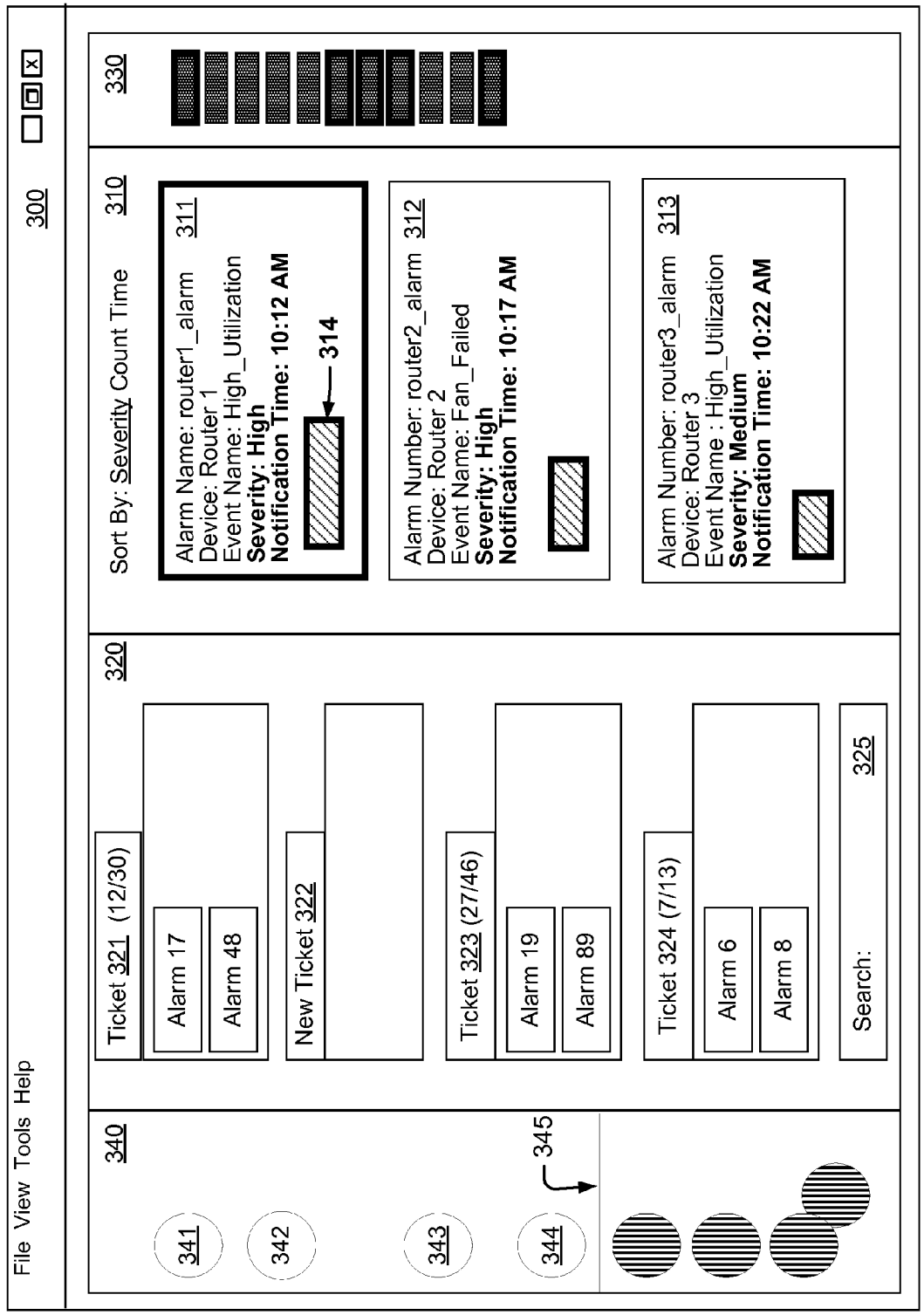

Users can drag reveal bar 345 vertically to reveal and inspect other tickets within ticket view 320. FIG. 4 illustrates graphical user interface 300 in such a configuration, after a user has dragged reveal bar 345 lower to reveal circle 344. Circle 344 corresponds to ticket 324, which is now shown in ticket view 320 responsive to the user revealing circle 344. Moreover, ticket 324 represents the fourth-highest ranked classification for alarm 311, as determined by algorithm engine 141 and classification ranker 142.

As discussed above, using ticket distance overview 340, users are provided with an estimate of the confidence of algorithm engine 141 in its recommendations. Thus, users who desire to inspect more tickets can do so, e.g., by dragging reveal bar 345 lower to show tickets that are ranked lower than the tickets currently visible in ticket view 320. In some implementations, the circular representations are color coded by the severity of the ticket's parent alarm. As mentioned above, the vertical position of the circular representations relative to the top of ticket distance overview 340 reflects the distance between the alarm being triaged and each ticket within the working set. Thus, the closer the circular representation of a ticket is to the top of ticket distance overview 340, the better a match the corresponding ticket is for the alarm with respect to the distance function. Vertical distances within ticket distance overview 340 can be normalized by interface module 143 so as to fit all of the existing (e.g., unresolved) tickets within the display, e.g., above and/or below reveal bar 345. Furthermore, horizontal positioning can be used to reduce overlap of circular representations that are of equal or near equal distance to the incoming alarm. Thus, where two tickets are relatively close to one another according to the distance function, one or both of the corresponding circular representations can be offset horizontally so as not to overlap within ticket distance overview 340.

A Specific Classification Algorithm

As discussed above, the disclosed implementations are consistent with various machine learning techniques, including nearest-neighbor interpolation, clustering, neural networks, statistical modeling, etc. The following sets forth one particular algorithm that can be implemented by algorithm engine 141, or other components and/or devices.

One aspect of the network triage scenario introduced above is the problem often resides in a dynamic environment, where the alarms as well as the currently-available tickets being generated are constantly changing. As mentioned above, one or more incoming alarms (represented by streaming alarm view 330) may exist at any given time and need to be triaged by the user. Likewise, the number of outstanding tickets existing at any given time can change, because the user may choose to add new tickets and existing tickets can be resolved by technicians. For the purposes of the following, the current set of tickets that are being used for triage recommendations and have not been resolved or otherwise discarded yet is referred to as the "working set of tickets."

To effectively operate in such a dynamic environment, algorithm engine 141 can implement a technique based on nearest neighbor classification. In particular, algorithm engine 141 can provide triage recommendations for an incoming alarm via a nearest-neighbor strategy that rank orders the working set of tickets by their similarity to that alarm. Similarity between an incoming alarm and available tickets can be measured using a distance function that is constantly changing as a result of user triage decisions, e.g., to refine the classification algorithm as discussed above.

Figure 5:
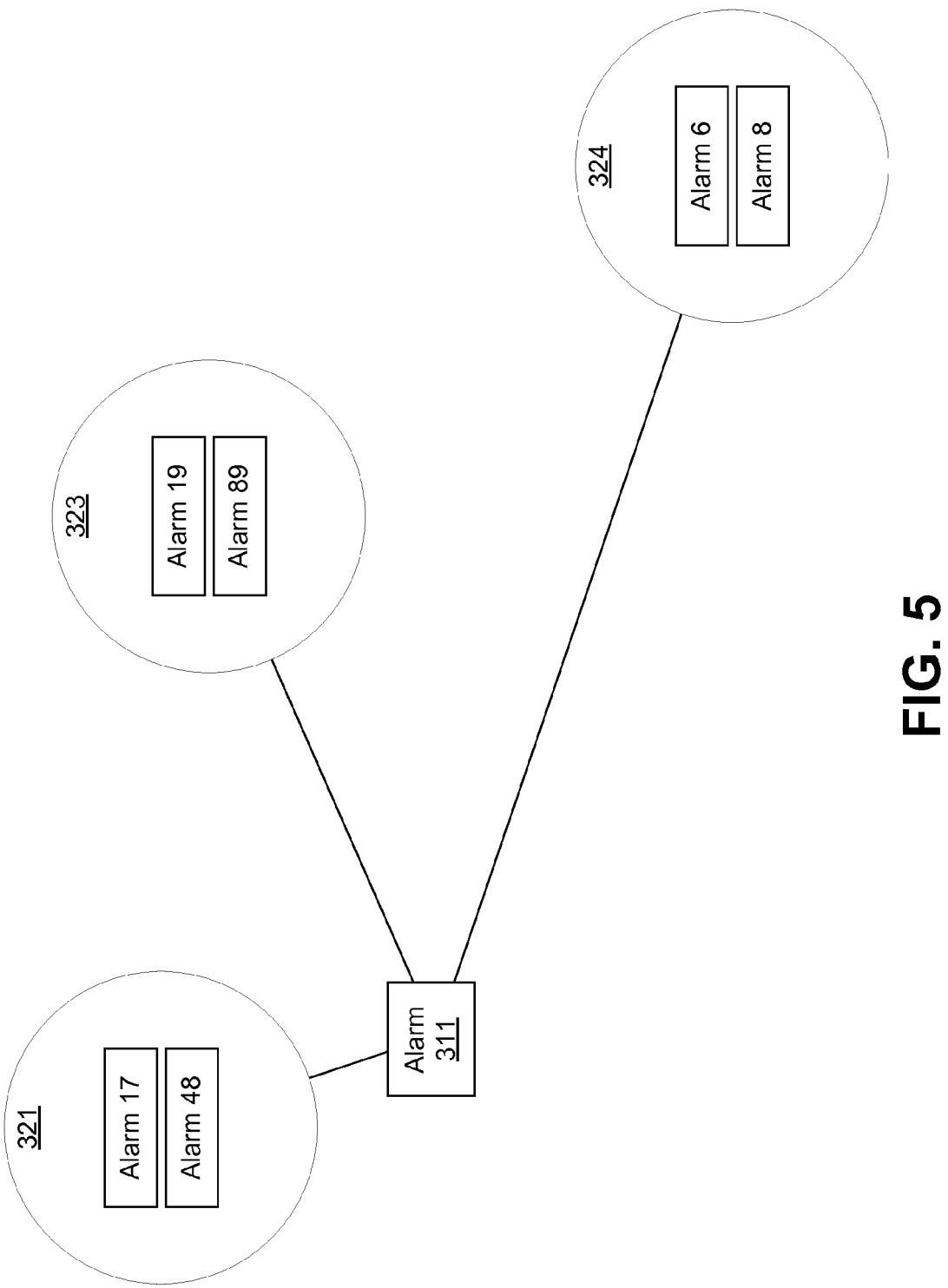
FIGS. 5 and 6 show visual representations of classification algorithms in accordance with some implementations of the present concepts.

FIG. 5 illustrates the nearest-neighbor strategy as applied by algorithm engine 141 for alarm 311. In FIG. 5, alarm 311 is shown with its relative distances to tickets 321, 323, and 324, respectively. Note that alarm 311 is shown closest to ticket 321, next closest to ticket 323, and furthest away from ticket 324. This generally corresponds to the order in which these tickets are ordered in ticket view 320 as shown in FIG. 4, as well as their corresponding circular representations 341, 343, and 344 in ticket distance overview 340.

While the nearest neighbor strategy can help match incoming alarms with existing tickets, algorithm engine 141 is also configured to identify that a ticket needs to be newly created, or "spawned." Thus, algorithm engine 141 can implement an extended nearest neighbor strategy by providing a mechanism for recommending when an incoming alarm should spawn a new ticket. Furthermore, when recommended, new tickets can be included in the ordered list of recommended classifications provided by classification ranker 141. By doing so, new tickets can be interactively spawned and added to the working set when a user judges that an incoming alarm is part of a new problem, or is otherwise unrelated to an existing ticket in the working set. In some implementations, tickets can be discarded from the working set when they are resolved. In other implementations, e.g., for development purposes, old tickets can be dynamically discarded from the working set over time to simulate the effect of problems represented by those tickets as being resolved. This, in turn, can reduce interference among existing tickets in the working set.

With respect to tickets that are already in the working set, algorithm engine 141 can measure similarity between the incoming alarm being classified by the user and tickets in the working set of tickets. Algorithm engine 141 can do so by computing the average distance between the incoming alarm and the already-triaged alarms that have been assigned to each of the tickets. Classification ranker 142 can then order the tickets by their average distance to the incoming alarm. Interface module 143 can use this ordering of tickets to display triage recommendations in ticket view 320.

Generally speaking, nearest neighbor techniques can evaluate data items based on one or more attributes, and use similarity between the attributes of individual data items to determine similarity between the corresponding items. In the particular case of network alarms, distance between alarms can be measured using individual distance metrics, each of which represents alarm similarity along attributes such as the following:

Device Name (e.g., ab1-cd2-ef3-gh4)
Device Type (e.g., Router, Switch)
Element Type (the part of the device, e.g., Port, that the device believes needs attention)
Name (includes Device Name and additional information such as the Element that needs attention, e.g., Port-ab1-cd2-ef3-gh4)
Severity (an integer ranging from 1 to 5 representing highest to lowest priority, respectively)
Event Name (e.g., Fan-3-Failed, High Utilization).

From these attributes, algorithm engine 141 can compute various string-based distance metrics, 17 of which are described below. Note that, because large organizations often follow standard device naming conventions, (e.g., the "ab1" in a device string such as ab1-cd2-ef3-gh4 may indicate the location of the device), some of the string-based metrics implicitly encode topological information about the underlying network structure (e.g., device ab1* is likely to be near device ab2*).

For alarm attributes Device Name, Name, and Event Name, as well as the four standard component parts of the Device Name (e.g., ab1-cd2-ef3-gh4 is divided into ab1, cd2, ef3, and gh4), algorithm engine 141 can determine two string-based distance metrics: the edit distance and the longest common substring (LCS), which can be converted to a distance according to:

$$d_{i,j} = \text{maxlength}(i,j) + s_{i,j} - 2s_{i,j}$$

where $s_{i,j}$ is the longest common substring between strings i and j and maxlength denotes the maximum string length from two strings i and j. This yields a total of fourteen metrics.

Note that edit distance and LCS have complementary strengths. For example, LCS is a good measure for strings that encode location. Devices "ab1*" and "ac1*" are likely in different locations. Here, the LCS distance is two, because the strings "ab1" and "ac1" have three characters and a longest common substring of one, leaving a distance of two. The edit distance is one, because one character needs to be changed to make the strings identical, e.g., "b" to "c" or vice versa. For these devices, LCS distance better captures that these are different than edit distance. As described below, learning the combination of these individual metrics can reduce the effect of any irrelevant metric (edit distance in this case).

For alarm attributes Device Type, Element Type, and Severity, algorithm engine 141 can compute one string matching distance metric each, yielding three more metrics.

This distance metric returns 0 if the attribute values are the same or 1 if they are different. Thus, the total of 17 distance metrics mentioned above includes the 14 edit and LCS distances and the three string matching distances.

Algorithm engine 141 can combine these 17 distance metrics using Mahalanobis distance, which parameterizes distance between any two alarms u and v, represented as d dimensional feature vectors, by a d×d positive definite covariance matrix A:

$$\text{Distance } (u,v) = (u-v)^T A(u-v)$$

This distance function effectively weights the 17 distances by the matrix A which encodes their relative importance for alarm classification and the correlations between them.

Algorithm engine 141 can learn the parameters of the matrix A from operators using an online metric learning algorithm such as LogDet Exact Gradient Online. The online learning algorithm can be extended to dynamic scenarios where both the number of classes and the environment (e.g., network topology) is varying. Thus, given a stream of categorized alarms, each labeled with the ticket to which it has been triaged, algorithm engine 141 can incrementally update the matrix A. In particular, algorithm engine 141 can update matrix A based on the user-selected ticket by encoding the labels as constraints indicating that the incoming alarm and each alarm in the selected ticket should be near each other. When an alarm spawns a new class, no update is made to the matrix A. Note, however, that this does change the working set of tickets. To learn the parameters of A, algorithm engine 141 can initialize A to the identity matrix, and set a regularization parameter η to 0.001. η can be a weight parameter that is akin to a "step size" in a gradient descent algorithm. Alternatively stated, η can signify amount of influence data has on learning the distance metric. Algorithm engine 141 can then update the parameters as users triage incoming network alarms. Algorithm engine 141 can continue this process for N alarms, and then fix the distance function. N can be determined empirically by experimentation or using other techniques. The final covariance matrix AN can be used by algorithm engine 141 in making recommendations for the remaining data.

The parameters learned by algorithm engine 141 for the matrix A can reflect the importance and correlations among the individual distance metrics that, in turn, explain the user's triage decisions. By learning the matrix A from data in this manner, the expense of expert tuning can be avoided. Moreover, the parameters can evolve dynamically as new alarms are received, new tickets are created, the network topology changes, etc.

The techniques discussed above can be used to create and update matrix A and iteratively classify network alarms. However, in some circumstances, the user may prefer to start a new ticket rather than assign an incoming alarm to an existing ticket. To account for this, algorithm engine 141 can maintain a threshold distance for starting a new ticket based on information about when users spawn new tickets. When a user spawns a new ticket for an incoming alarm, the distance between this alarm and the nearest ticket in the working set is stored by algorithm engine 141. Various strategies can be used for computing the threshold distance from these stored distances, including taking the minimum and average over various window sizes of the most recently stored distances. In some implementations, the minimum distance within a window of the five most recent stored distances performs well. That a small window size such as five performs well relative to larger sizes may be due to the new threshold needing to reflect the dynamically changing distribution of tickets in the metric space.

For each set of recommendations that algorithm engine 141 produces for an incoming alarm, it can also compute the latest new ticket threshold distance using the strategy above. Algorithm engine 141 can generate a corresponding "start new ticket" recommendation into the list of recommendations. Classification ranker 142 can rank the "start new ticket recommendation" according to this distance. Moreover, when the user determines that an incoming alarm is part of a new problem, a new ticket can be created. The new ticket can be added to the working set and used in recommendations for future incoming alarms in the stream.

Algorithm engine 141 can also automatically discard old tickets to simulate the resolution of problems. For example, algorithm engine 141 can use a windowing mechanism to discard old tickets. In particular, algorithm engine 141 can fix the window size to N, which is the number of alarms used for learning the covariance matrix A introduced above. When the number of unique alarms in the working set of tickets exceeds N, algorithm engine 141 can remove the oldest ticket from the working set. Spawning new tickets and discarding old tickets in this manner can help algorithm engine 141 continually refine its recommendations. This is because the working set of tickets used for the recommendations is continually evolving as the user interacts with classification module 140 through graphical user interface 300.

Figure 6:
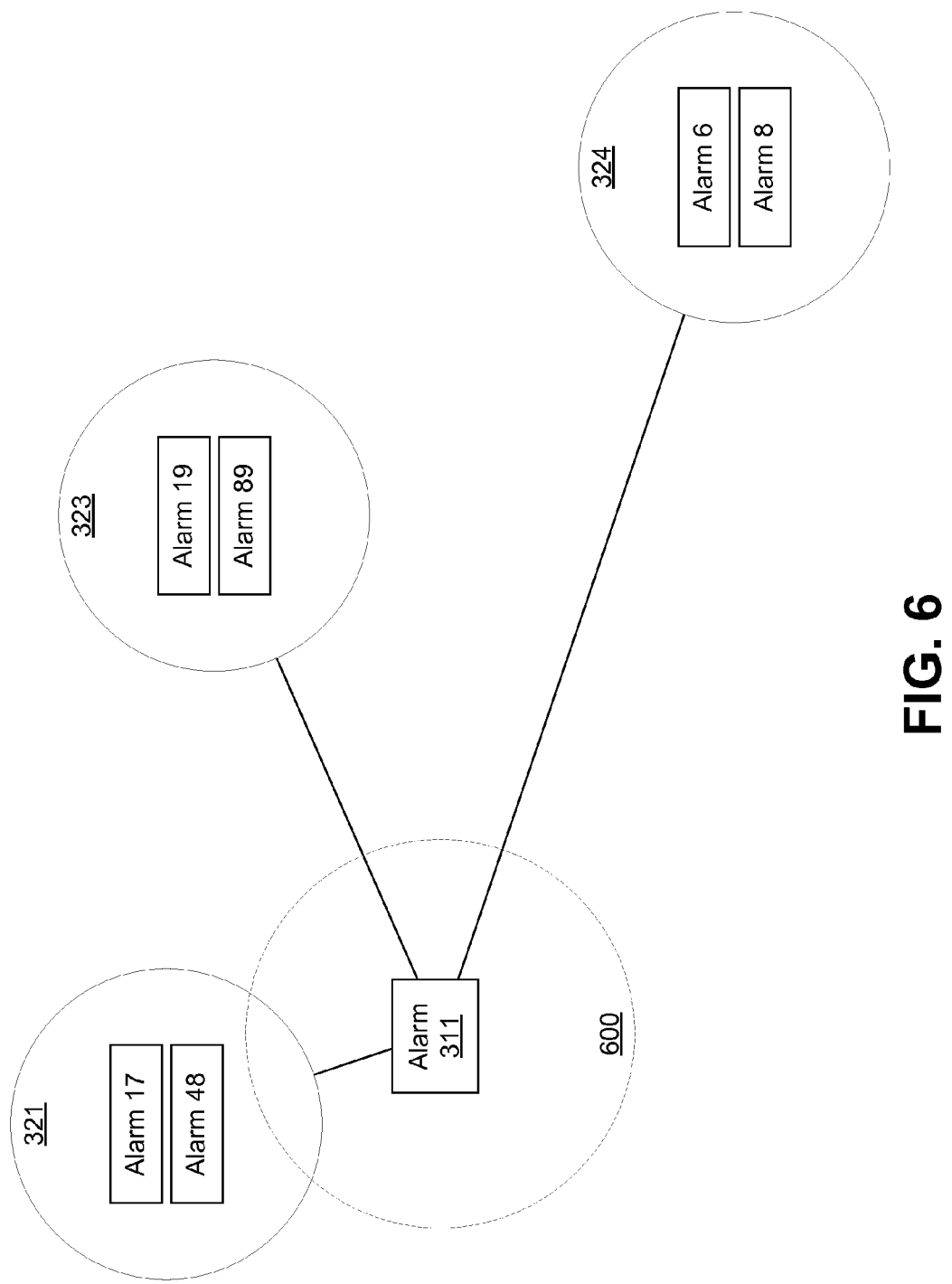

FIG. 6 illustrates the above-described extended nearest-neighbor strategy for alarm 311. In FIG. 6, alarm 311 is again shown with its relative distances to tickets 321, 323, and 324, as discussed above with respect to FIG. 5. However, FIG. 6 also includes a representation of new ticket threshold 600, which can be calculated as discussed above. Generally speaking, the radius of the circle illustrating new ticket threshold 600 is proportional to the threshold. The new ticket recommendation can be ranked lower than tickets that overlap with the radius of new ticket threshold 600, i.e., ticket 321 in FIG. 6. The new ticket recommendation can be ranked higher than tickets that do not overlap with the radius of new ticket threshold 600, i.e., tickets 323 and 324 in FIG. 6. As mentioned above with respect to FIG. 5, the relative distances shown in FIG. 6 generally correspond to the ranking of tickets 321, 322, 323, and 324 in ticket view 320.

Conclusion

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. One or more hard drives, optical storage devices, or volatile or nonvolatile memories having stored therein instructions which, when executed by one or more processing devices, cause the one or more processing devices to perform acts comprising:

identifying one or more likely classifications for an incoming data item from a working set of classifications. the one or more likely classifications being identified using an algorithm and including at least a first classification to which one or more first data items have already been assigned and a second classification to which one or more second data items have already been assigned, wherein the incoming data item has not yet been assigned to any of the one or more likely classifications;

displaying a graphical user interface, the displayed graphical user interface showing displayed representations of:
the first classification,
an individual first data item that has already been assigned to the first classification,
the second classification,
an individual second data item that has already been assigned to the second classification, and
the incoming data item that has not yet been assigned to any of the one or more likely classifications;

receiving, via the displayed graphical user interface, a user input from a user selecting the displayed representation of the first classification representation for the incoming data item;

assigning the first classification to the incoming data item based on the user input received via the displayed graphical user interface; and refining the algorithm to reflect that the user input from the user selected the displayed representation of the first classification for the incoming data item.

2. The one or more hard drives, optical storage, devices, or volatile or nonvolatile memories according to claim 1, wherein the incoming data item comprises a streaming data item from an incoming stream of data items that includes the one or more first data items and the one or more second data items.

3. The one or more hard drives, optical storage devices, or volatile or nonvolatile memories according to claim 2, wherein the displayed graphical user interface further comprises other representations of other data items from the incoming stream.

4. The one or more hard drives, optical storage devices, or volatile or nonvolatile memories according to claim 1, the acts further comprising:
sorting the displayed representations by one or more attributes.

5. The one or more hard drives, optical storage devices, or volatile or nonvolatile memories according to claim 1, wherein an individual likely classification for the incoming data item is a new classification that is not in the working set and the displayed graphical user interface comprises a new classification representation of the new classification.

6. The one or more hard drives, optical storage devices, or volatile or nonvolatile memories according to claim 5, wherein the algorithm considers attributes of the incoming data item, the one or more first data items, and the one or more second data items, the attributes comprising:
device name,
device type,
device port, and
severity.

7. A system comprising;
at least one processing device; and
at least one storage device storing computer-readable instructions which, when executed by the at least one processing device, cause the at least one processing device to:
using an algorithm, recommend tickets to which an incoming alarm can be assigned, the recommended tickets including at least a first ticket and a second ticket;
display a graphical user interface comprising:
a first ticket representation of the first ticket
a second ticket representation of the second ticket, and
an incoming alarm representation of the incoming alarm;
receive a selection, via the graphical user interface of the first ticket representation;
assign the incoming alarm to the first ticket instead of the second ticket based on the selection received via the graphical user interface; and
refine the algorithm to reflect assignment of the incoming alarm to the first ticket instead of the second ticket.

8. The system according to claim 7, wherein the selection comprises dragging and dropping the incoming alarm representation on the first ticket representation, double-clicking the first ticket representation, or right-clicking the first ticket representation.

9. The system according to claim 7, wherein the recommended tickets comprise a new ticket, and the algorithm calculates a new ticket threshold distance based on previous instances where other new tickets were created.

10. The system according to claim 9, wherein the graphical user interface further comprises other representations of best matching alarms or parent alarms for the recommended tickets.

11. The system according to claim 10, wherein the graphical user interface further comprises a ticket distance overview that includes:
a visible region with corresponding representations of certain
recommended tickets that are currently displayed on the graphical user interface; and
an invisible region.

12. The system according to claim 11 wherein the ticket distance overview comprises a moveable element to adjust the visible region and the invisible region to reveal other corresponding representations other recommended tickets.

13. The system according to claim 7, wherein the graphical user interface comprises a streaming alarm overview comprising other alarm representations of other alarms that do not yet have ticket assignments.

14. A method implemented by at least one computing device, the method comprising:
using an algorithm to identify potential classifications for an incoming data item, the potential classifications including at least a first classification to which one or more first data items have already been assigned and a second classification to which one or more second data items have already been assigned, wherein the incoming data item has not been assigned to the first classification and has not been assigned to the second classification;
displaying a graphical user interface, the displayed graphical user interface
showing displayed representations of: the first classification,
an individual first data item that has already been assigned to the first classification,
the second classification;
an individual second data item that has already been assigned to the second classification, and
the incoming data item;
receiving, via the displayed graphical user interface, a user input from user selecting the displayed representation of the first classification representation for the incoming data item;
assigning the first classification to the incoming data item based on the user input received via the displayed graphical user interface; and refining the algorithm to reflect the assignment of the first classification to the incoming data item based on the user input.

15. The method of claim 14, further comprising:
applying a nearest-neighbor technique to a group of classifications to
determine the potential classifications for the incoming data item
based on attributes of the incoming data item and corresponding attributes of a plurality of classifications of the group.

16. The method of 14, wherein the incoming data item comprises a streaming data item from an incoming stream of data items, the incoming stream of data items including the one or more first data items and the one or more second data items.

17. The method of claim 14, wherein:
the incoming data item is an incoming network alarm,
the one or more first data items are first network alarms,
the first classification is a first ticket to which the user has already assigned the first network alarms,
the one or more second data items are second network alarms, and
the second potential classification is a second ticket to which the user
has already assigned the second network alarms.

18. The method of claim 14, wherein:
using the algorithm to identify the potential classifications comprises:
calculating one or more first distances between the incoming data item and the one or more of the first data items; and
calculating one or more second distances between the incoming data item and the one or more of the second data items.

19. The method of claim 18, wherein the algorithm is refined such that a corresponding distance between the incoming data item and the first classification decreases.

20. The method of claim 14, further comprising identifying the potential classifications by ranking a plurality of classifications; the ranking comprising comprises:
determining corresponding representative data items for each of the plurality of potential classifications: and
determining relative distances of the incoming data item from the corresponding representative data items.

* * * * *